Patented June 7, 1932

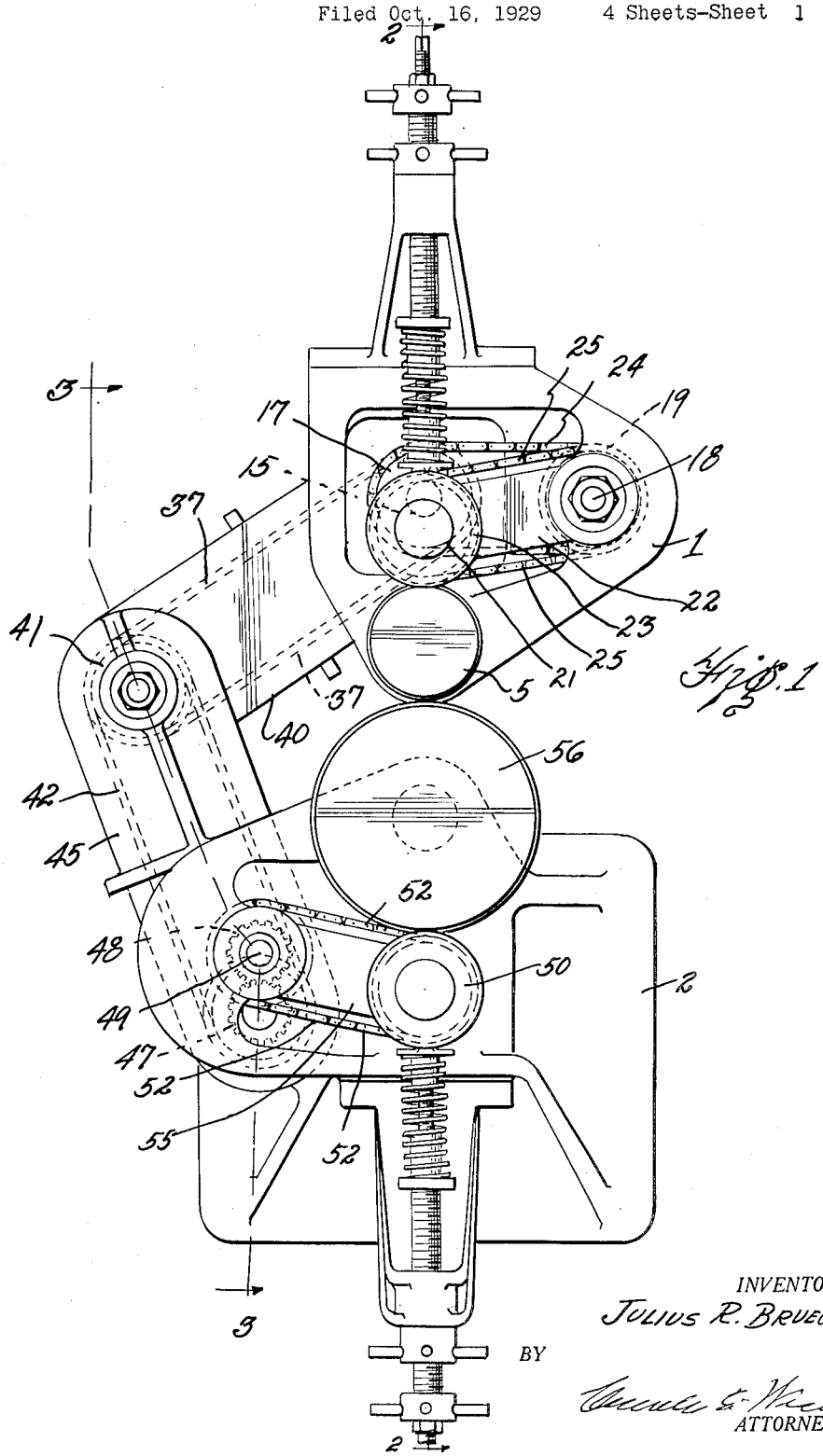

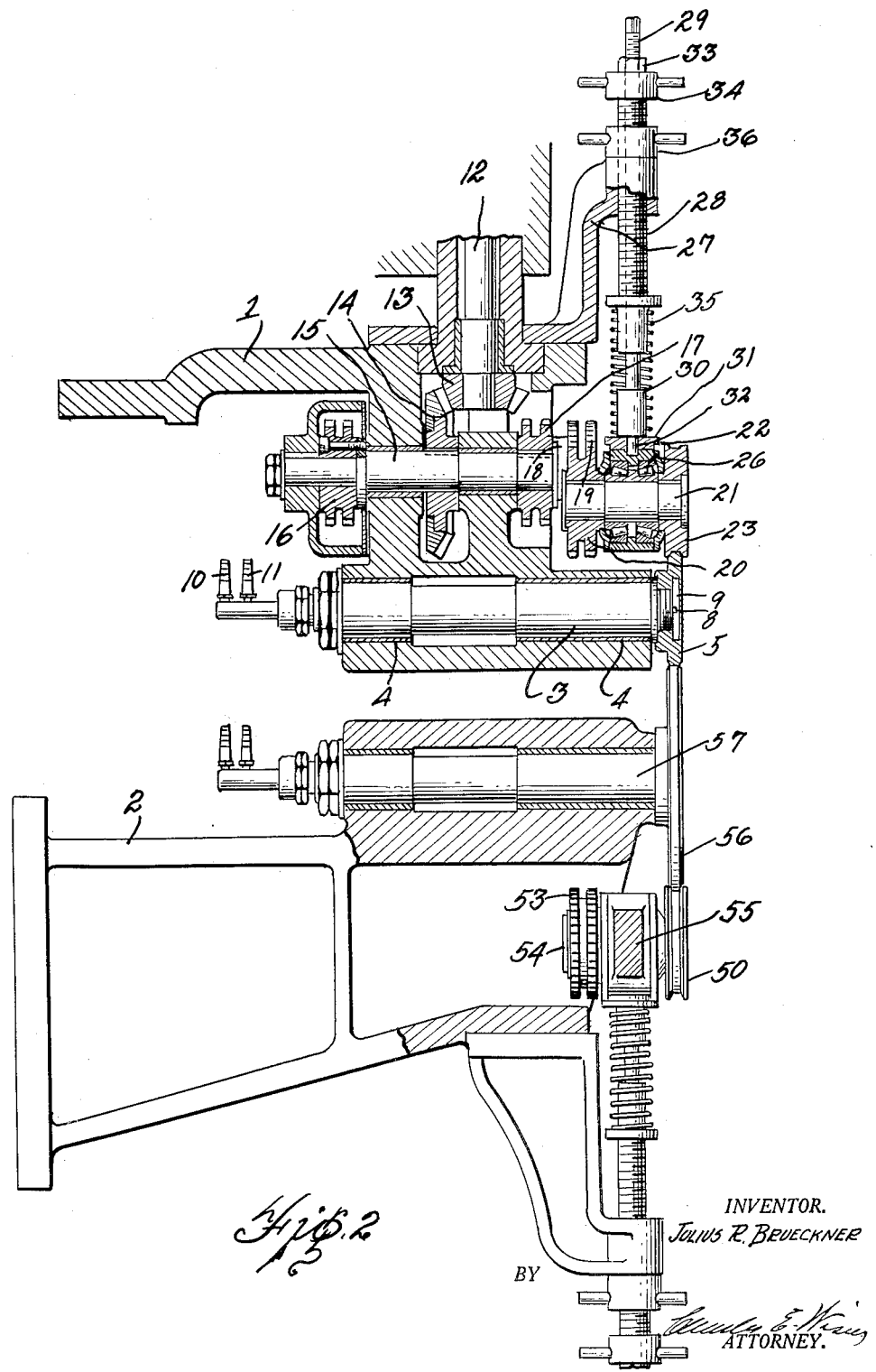

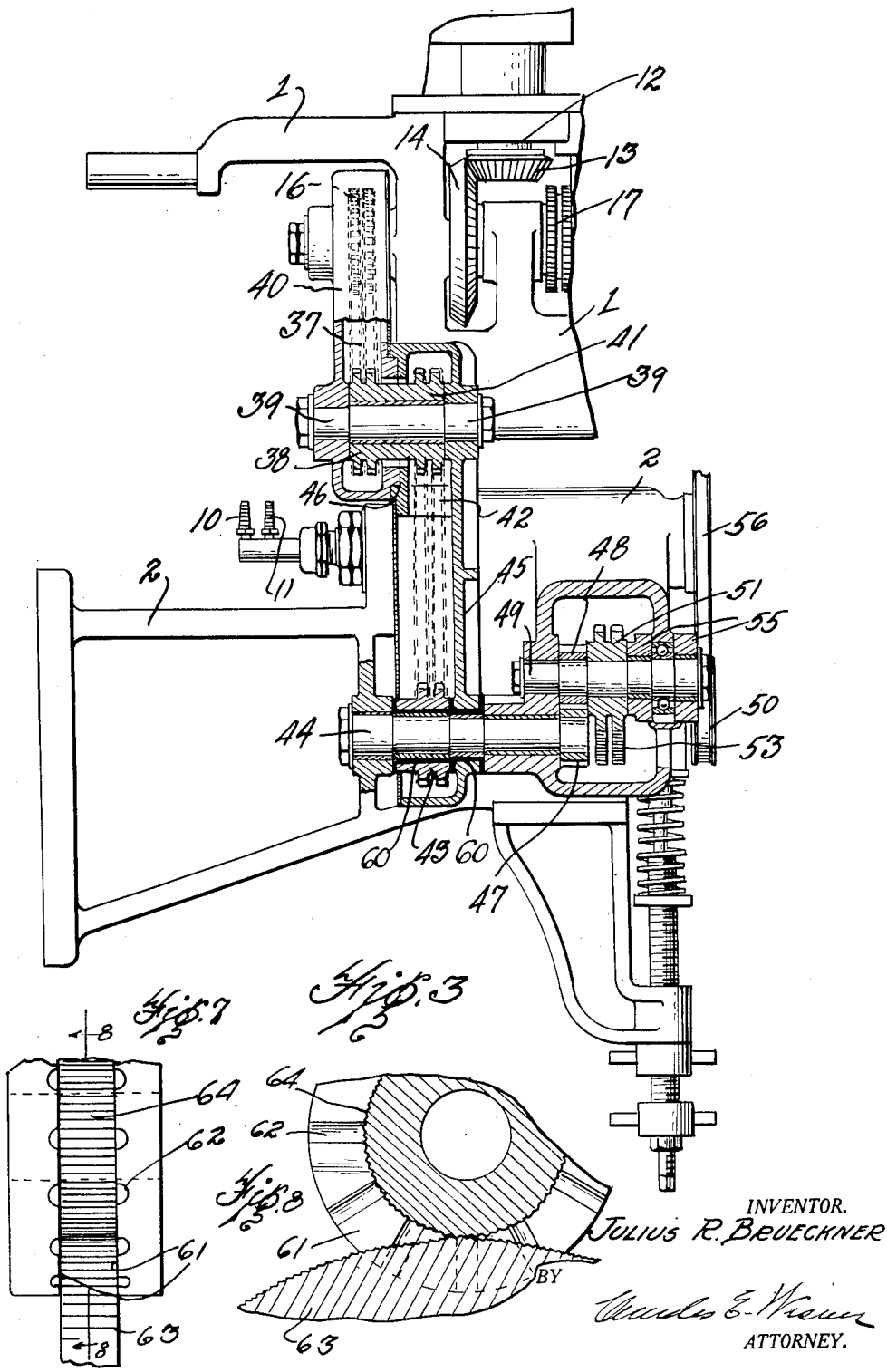

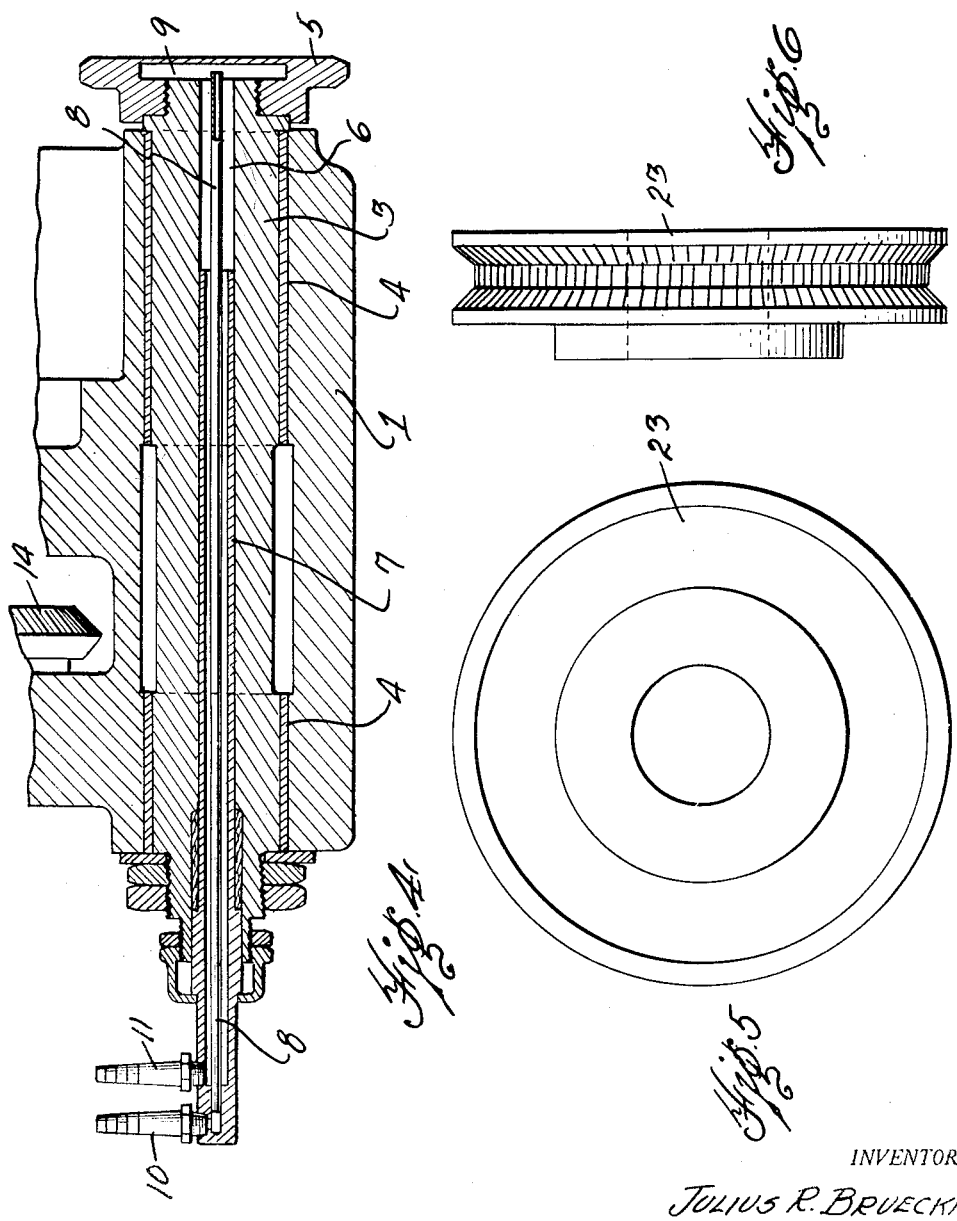

1,862,108

UNITED STATES PATENT OFFICE

JULIUS R. BRUECKNER, OF BAY CITY, MICHIGAN, ASSIGNOR, BY MESNE ASSIGNMENTS, TO THOMSON-GIBB ELECTRIC WELDING COMPANY, A CORPORATION OF MASSACHUSETTS

SEAM WELDING MACHINE

Application filed October 16, 1929. Serial No. 399,889.

This invention relates to welding machines and the object of the invention is to provide a machine having welding rollers which are driven at the same peripheral speed irrespective of the diameter of the welding rollers.

Another object of the invention is to provide an automatic welding machine in which the welding rollers are driven to feed the work therethrough, the welding rollers being provided with knurled peripheries for this purpose.

A further object of the invention is to provide a means for re-forming the welding rollers during rotation thereof to prevent the rollers from mushrooming at the periphery due to the pressure and excessive heat applied thereto.

A further object of the invention is to provide a machine of the character described in which two knurling rollers are provided riding in contact with the welding rollers the knurling rollers being driven to drive the welding rollers at the periphery and the welding rollers being movable toward each other into contact with the work.

A further object of the invention is to provide a machine in which the knurling rollers knurl the welding rollers on the peripheral face and at each side thereof to form the edges of the welding rollers and to overcome the mushrooming effect of the welding rollers, the action of the knurling rollers in forming the heated edges of the welding rollers being similar to a forging action and toughens the edges of the welding rollers and reduces wear.

These objects and the several novel features of the invention are hereinafter more fully described and claimed and the preferred form of construction by which these objects are attained is shown in the accompanying drawings in which—

Fig. 1 is a front elevation of a welding machine embodying my invention.

Fig. 2 is a section taken on line 2—2 of Fig. 1.

Fig. 3 is a section taken on line 3—3 of Fig. 1.

Fig. 4 is a section through a welding roller shaft showing the cooling means.

Fig. 5 is a face view of one of the knurling rollers.

Fig. 6 is an edge view thereof.

Fig. 7 is an edge view of an alternative form of knurling roller showing the welding roller in relation thereto.

Fig. 8 is a section taken on line 8—8 of Fig. 7.

As shown in Fig. 1 the device comprises a casting or base 1 adapted to be secured to a standard (not here shown) and a casting or base 2 which is adapted to be adjustably secured to the same standard. The casting 1 carries a shaft 3 in the bearings 4 and a copper welding roller 5 is secured to the end of this shaft. The shaft 3 is shown in section in Fig. 4. From this figure it will be noted that the shaft 3 is provided with an aperture 6 therethrough and a tube 7 is mounted in this aperture and a tube 8 extends through the tube 7 into the chamber 9 formed in the welding roller 5. A connection 10 is provided for a hose by which water may be fed through the tube 8 into the chamber 9 and the water is returned through the tube 7 and outwardly through a connection 11 into a discharge hose.

This provides a means for cooling the welding roller and the hose connected to the couplings 10 and 11 holds the tubes 7 and 8 stationary while the shaft 3 rotates thereabout. A drive shaft 12 is provided having a beveled gear 13 thereon meshing with the beveled gear 14, secured to the shaft 15. A chain sprocket 16 is mounted on one end of the shaft 15 and a chain sprocket 17 is mounted on the other end thereof. As will be understood from Fig. 1 a shaft 18 is mounted at one side of the shaft 15 and is provided with a sprocket thereon (not here shown) but positioned immediately behind the sprocket 17 shown in Fig. 2. The shafts 15 and 18 are connected together by the chain 24 shown in Fig. 1 which engages the sprocket 17 on the shaft 15 and the companion sprocket on the shaft 18. A second sprocket 19 is mounted on the shaft 18 as shown in Fig. 2 and a chain 25 connects this sprocket with the sprocket 20 on the shaft 21. This shaft 21, as will be understood from Fig. 1, is carried in the end of an arm 22 which pivots on the shaft 18. To the outer end of the shaft 21 a hardened steel knurling roller 23 is secured and this knurling roller is adjustable in position by swinging the arm 22 on the pivot 18. This knurling roller 23 engages over the periphery of the copper welding roller 5, as shown in Figs. 1 and 2, and is adapted to be driven by the chain 25 thus rotating the welding roller 5 with which it rides in contact.

As will be noted from Fig. 6 the hardened steel knurling roller 23 is provided with a substantially V shaped groove in its periphery which is knurled and as the knurling roller is rotated it knurls the copper welding roller 5 so that the roller 5 will not readily slip on the work. As will be noted from Fig. 2 the end of the arm 22 is provided with an opening in which a roller bearing 26 is mounted and in which the shaft 21 is rotated. In order to hold the knurling roller 23 in contact with the welding roller 5 it is necessary to put a pressure on this end of the arm containing the bearing 26. For this reason an arm 27 is secured to the member 1 and a tube 28 is threaded through the arm 27. A shaft 29 is threaded through the tube 28 and is provided with an enlarged end 30 on the lower end thereof riding in contact with a washer 31. The end 32 of the shaft 29 extends through the washer 31 and into a recess provided therefor in the end of the arm 22, as shown in Fig. 2. By this arrangement the shaft 29 may be adjusted to place a positive pressure on the end of the arm 21 thus placing a pressure on the knurling roll 23 at its point of contact with the welding roll 5. The shaft 29 is provided with a squared upper end by which it may be adjusted and a lock nut 33 is provided for locking the shaft 29 in position. A member 34 is provided for turning the tube 28 which may be adjusted to place a tension on the spring 35 and the tension of the spring 35 tends to force the end of the arm 22 downwardly to hold the knurling roll 23 in contact with the welding roll 5 as the welding roll is reduced in diameter by wear. A lock nut 36 is provided on the tube 28 by which it may be locked in position.

The sprocket 16 on the shaft 15, shown in Figs. 2 and 3, is connected by means of a chain 37, shown in Figs. 1 and 3, to a sprocket 38 on a shaft 39. This shaft is rotatably mounted in a housing 40 which is pivoted on the shaft 15, as shown in Figs. 2 and 3. On the same hub as the sprocket 38 is a sprocket 41 which is connected by means of a chain 42 with the sprocket 43 on the shaft 44. The shaft 44 is rotatably mounted in the casting or base member 2 and is fixed in position and a housing 45 is pivoted in the shaft 44 and supports the shaft 39 in the upper end thereof. The shaft 39 is also rotatably mounted in the housing 40 which is pivoted on the fixed shaft 15. By this arrangement the housings 40 and 45 are pivoted together to have a scissors action when the lower base member 2 is moved toward or away from the upper casting or base member 1. For this reason the housings are provided with interengaging annular shoulders 46 which allow the housings to turn on the shaft 39 as a pivot. As will be noted from Fig. 3 bushings are positioned on the shaft 44 between the shaft and the sprocket 43 and between the shaft and the arm 45. To prevent flow of current from the casting 1 to the casting 2 through the chains 37 and 42 and arms 40 and 45, insulation 60 is provided between the sprocket 43 and arm 45 and bushings on the shaft 44. This prevents flow of current through the scissors acting arms and chains and confines the current flow to the welding rollers.

By means of the chains 37 and 42 the shaft 44 is rotated and this shaft is provided with a spur gear 47 on the end thereof meshing with the spur gear 48 on the shaft 49, as shown in Figs. 1 and 3. These spur gears are used to correct the direction of rotation of the lower knurling roller 50. A sprocket 51 is mounted on the shaft 49, shown in Fig. 3, and a chain 52 shown in Fig. 1, connects this sprocket with the sprocket 53 on the shaft 54 which is rotatably mounted on the end of the arm 55, shown in Figs. 1 and 2.

The knurling roller 50 is mounted on the end of a shaft 54 and engages over the welding roller 56 mounted on the shaft 57 shown in Figs. 1 and 2. This shaft is an exact duplicate of the shaft 3 shown in Fig. 2 and the water connections of this shaft are the same as those shown in Fig. 4. It is also necessary to place a pressure on the knurling roller 50 and this construction is an exact duplicate of that shown at the top of Figs. 1 and 2.

To operate the device the shaft 12 is driven which by means of the beveled gears 13 and 14, rotates the shaft 15 and by means of the chain 24 connecting the shafts 15 and 18 the shaft 18 is rotated. This rotates the sprocket 19 with the shaft 18 and the chain 25 rotates the shaft 21 and knurling roller 23 thereon thus driving the welding roller 5 by peripheral contact. Rotation of the shaft 15 also rotates the sprocket 16 and chain 37 thus rotating the sprockets 38 and 41 and by means of the chain 42 the sprocket 43 and shaft 44 are rotated.

The shaft 44 and spur gear 47 secured thereto are thus rotated and the spur gear 48 meshing with the spur gear 47 is rotated thus rotating the shaft 49. The rotation of the shaft 49 rotates the sprockets 51 and 53 thus rotating the shaft 54 and knurling roller 50 which rotates the welding roller 56 by peripheral contact. The sheets to be welded are passed between the welding rollers 5 and 56 at their point of contact and these rollers move the work therethrough due to the knurled edges of the welding rollers which grip the work.

The base member 1 is usually mounted in a stationary position while the base member 2 is usually adjustably mounted on a vertical bed provided on a welding machine standard. By adjusting the position of the member 2 in relation to the member 1 the welding rolls 5 and 56 may be adjusted relative to each other to properly engage the work. It will be noted that in this adjusting movement the housings 40 and 45 have a scissors movement and as the pivot points of these housings coincide with the axes of the chain sprockets the scissors action of the housings is free from friction. During the welding operation the peripheral edges of the welding rollers become very hot in spite of the water circulated through the welding rollers and due to the pressure applied to these rollers the edges ordinarily mushroom or flatten out so that the welding current is dissipated by being distributed over too great an area to produce the most efficient weld.

It is for this reason that the knurling rollers are applied to the welding rollers as the knurling rollers work the edges of the welding rollers back to a narrow welding edge. These knurling rollers also at the same time knurl the peripheral edges of the welding rollers so that the welding rollers will properly grip the work in feeding the work therebetween. Also the working of the copper at the periphery of the welding rollers while under high temperature is similar to a forging action and tends to toughen the copper at the edges of the welding rollers to increase their resistance to wear. It is also to be noted that the machine may be driven in either direction by rotating the drive shaft 12 in one direction or the other.

Another very important feature of the invention is due to the fact that the welding rolls are driven at the same peripheral speed irrespective of their size. The knurling rollers 23 and 50 are both driven at the same speed and it makes no difference whether the welding rollers 5 and 56 are larger or smaller or whether one roll is larger than the other or not as the speed of the periphery of the two welding rollers will always be the same due to the fact that the peripheral speed of the knurling rollers 23 and 50 is always the same. It will also be noted that the arms 22 and 55 in the ends of which the knurling rollers are carried may swing through an arc from the shafts 18 and 49 as pivots and consequently these arms may be adjusted in position to accommodate welding rollers of different diameters.

It will also be noted that as the shafts of the welding rollers are the same the welding rollers including their shafts may be interchanged or a new welding roller and shaft may be readily inserted in the machine at any time by loosening the pressure arrangement for the knurling rollers and adjusting the position of the base member 2 in relation to the base member 1 to bring the peripheral edges of the welding rollers to proper position.

As will be noted from Fig. 2 it is necessary for current to flow through the shafts 15 and 57 of the knurling rollers and for this reason the bushings for these shafts must fit quite closely. Ordinarily the pressure placed on the welding rollers would tend to place a heavy pressure in one direction on each shaft resulting in excessive wear so that the current would only have two points of contact through which to flow through the shaft and this small contact area would tend to heat the bearing thus increasing the wear. With my device, however, the pressure is equal on both sides of the welding rollers so that the shafts 15 and 57 are permitted to float concentric in their bearings and will provide points of contact for current flow equally throughout the surface of the shafts.

An alternative form of the knurling roller is shown in Figs. 7 and 8. This roller is to be utilized on heavy duty machines where very wide rolls are used. In this form the sides 61 of the groove are flat and are provided with radial grooves 62 which are formed with cutting edges and are adapted to shave the edges of the welding roller 63 as the knurling roller is rotated to drive the welding roller. The bottom 64 of the groove is knurled as before to give the proper traction in driving the roller 63 and at the same time the edge of the welding roller is knurled to increase its traction on the metal being welded. This roller not only knurls the periphery of the welding roller but at the same time trims the edges thereof by shaving off the excess material thus maintaining the edge of the welding roller at a fixed width. Different formed teeth 62 may also be used in the faces 61 of the knurling roller for trimming the edges of the welding rollers as the knurling roller rotates in driving the welding roller.

From the foregoing description it becomes evident that the device is very simple and efficient in operation, will maintain the welding rollers at their greatest efficiency at all times, will automatically feed the work through the welding rollers and provides a device which accomplishes the objects described.

Having thus fully described my invention, its utility and mode of operation, what I claim and desire to secure by Letters Patent of the United States is—

1. In a welding machine, a pair of base members, a welding roller rotatably mounted in each base member, a knurling roller engaging the periphery of each welding roller, a pivoted arm in which each knurling roller is rotatably mounted, variable means for placing a pressure on each knurling roller to hold it in contact with its welding roller, a pair of pivoted housings connecting the base members, a series of sprockets and chains in the said housings and sprockets and a chain for each knurling roller drivingly connected with the first named series of sprockets and chains, the housings being movable on their pivots by relative movement of the base members.

2. In a welding machine, a pair of base members, a welding roller rotatably mounted in each base member, a knurling roller provided with an internally knurled channel in its periphery engaging over the edge of each welding roller, the knurling rollers forming and knurling the edges of the welding rollers as they are rotated, the base members being relatively adjustable to vary the relative position of the welding rollers, and means for driving the knurling rollers.

3. In a welding machine, a pair of base members, a welding roller rotatably mounted in each base member, an arm pivotally mounted on each base member, a knurling roller rotatably mounted in the end of each arm and normally riding in engagement with the periphery of the respective welding roller, adjustable means for placing a pressure on the knurling roller to hold it in engagement with the respective welding roller, drive means connecting the two knurling rollers, and means whereby the base members may be relatively moved without disconnecting the driving means.

4. In a welding machine, a pair of relatively movable base members, a welding roller rotatably mounted in each base member, the base members being movable to bring the welding rollers to contact with the work, a pair of knurling rollers engaging the periphery of the welding rollers, means for driving the knurling rollers, the knurling rollers being adapted to knurl and form the peripheral edges of the welding rollers as the knurling rollers are rotated.

5. In a welding machine, a pair of base members, a welding roller rotatably mounted in each base member, the base members being relatively movable to bring the welding rollers toward or away from each other, a knurling roller engaging over the periphery of each welding roller, means for driving the knurling rollers, each knurling roller being provided with an internally knurled substantially V shaped groove in its periphery for re-forming the edges of the welding rollers during the welding operation.

6. In a welding machine, a pair of base members mounted one above the other, a knurling roller rotatably mounted on each base member, means for rotating the knurling roller in the upper carrier, a pair of housings pivotally connected together and pivoted in the base members, driving mechanism extending through the housings to the knurling roller in the lower base member, and a pair of welding rollers driven at the periphery by the said knurling rollers.

7. In a welding machine, a pair of welding rollers, a base member in which each welding roller is rotatably mounted, a knurling roller engaging the periphery of each welding roller and adapted to knurl the periphery of each welding roller as the knurling roller is rotated, the base members being relatively adjustable, and means including a series of chains and sprockets therefor arranged in consecutive relation and including sprockets and a chain therefor at the opposite ends of the series respectively drivingly connected with the knurling rollers whereby said knurling rollers may be driven from the same source of power irrespective of the adjustment of the base members.

8. In a welding machine, a pair of welding rollers, a knurling roller engaging the periphery of each welding roller, means for rotating the knurling rollers to drive the welding rollers, a base member supporting each welding roller and its companion knurling roller, one base member being adjustable in relation to the other, and means for driving the knurling rollers at any adjustment of the base members.

9. In a welding machine, a pair of base members, a welding roller rotatably mounted in each base member, a knurling roller engaging the periphery of each welding roller and adapted to drive each welding roller and knurl the periphery thereof as the knurling roller is rotated, and means for driving the knurling rollers of both base members from the same source of power irrespective of the adjustment of the base members.

10. In a welding machine, a pair of welding rollers, a support for each roller, said supports being adjustable as to distance apart, a knurling roller carried by each support and engaging the periphery of the respective welding roller, means for rotating the knurling rollers to drive the welding rollers, said means including a driving connection between the knurling rollers, and means electrically separating the knurling rollers, the knurling rollers being each provided with a substantially V shaped internally knurled channel in the periphery thereof engaging over the periphery of the welding rollers.

11. In a welding machine, a pair of relatively movable base members, a pair of welding rollers rotatably mounted in the base members, the welding rollers being rotatable in the same plane, a pair of knurling rollers engaging over the edges of the welding rollers, means for driving the knurling rollers, said means including a driving connection extending between the knurling rollers, an insulation electrically separating the same and adjustable means for maintaining the knurling rollers in engagement with the welding rollers.

12. In a welding machine, a pair of relatively movable base members, a pair of welding rollers rotatably mounted in the base members, and means for driving the welding rollers comprising a pair of driven knurling rollers engaging over the edges of the welding rollers and adapted to drive the welding rollers as the knurling rollers are rotated, said knurling rollers being drivingly connected together to rotate at the same surface speed, and an insulation electrically separating the knurling rollers.

13. In a welding machine, a pair of welding rollers, a knurling roller engaging the periphery of each welding roller, means for rotating the knurling rollers to drive the welding rollers, said means including a driving connection between the knurling rollers, means for electrically insulating the knurling rollers one from the other, the knurling rollers being shaped to re-form the peripheral edges of the welding rollers while under heat of the welding operation.

14. In a welding machine, a pair of welding rollers, a knurling roller engaging the periphery of each welding roller, means for rotating the knurling rollers to drive the welding rollers, the knurling rollers having a serrated face shaped to continuously re-form the peripheral edges of the welding rollers while at the welding heat.

In testimony whereof I sign this specification.

JULIUS R. BRUECKNER.